United States Patent
Herczog

(10) Patent No.: US 7,716,442 B2
(45) Date of Patent: May 11, 2010

(54) INTERFACING PROCESSORS WITH EXTERNAL MEMORY SUPPORTING BURST MODE

(75) Inventor: Eugene Pascal Herczog, Hertfordshire (GB)

(73) Assignees: MStar Semiconductor, Inc. (KY); MStar Software R&D, Ltd., Shenzen (TW); MStar France SAS, Issy les Mouineaux (FR); MStar Semiconductor, Inc. (TW)

( * ) Notice: Subject to any disclaimer, the term of this patent is extended or adjusted under 35 U.S.C. 154(b) by 370 days.

(21) Appl. No.: 10/489,800

(22) PCT Filed: Sep. 17, 2002

(86) PCT No.: PCT/GB02/04216

§ 371 (c)(1),
(2), (4) Date: Aug. 31, 2004

(87) PCT Pub. No.: WO03/025768

PCT Pub. Date: Mar. 27, 2003

(65) Prior Publication Data

US 2005/0005035 A1 Jan. 6, 2005

(30) Foreign Application Priority Data

Sep. 17, 2001 (GB) ................................. 0122401.3

(51) Int. Cl.
*G06F 13/14* (2006.01)
(52) U.S. Cl. .................. 711/167; 711/163; 710/22; 710/35; 712/214; 370/352
(58) Field of Classification Search .................. 710/22, 710/35; 711/167, 163; 712/214; 370/352
See application file for complete search history.

(56) References Cited

U.S. PATENT DOCUMENTS

| 5,592,435 | A | | 1/1997 | Mills et al. | |
|---|---|---|---|---|---|
| 5,878,240 | A | * | 3/1999 | Tomko | 710/316 |
| 5,903,914 | A | * | 5/1999 | Zulian | 711/163 |
| 6,061,346 | A | * | 5/2000 | Nordman | 370/352 |

(Continued)

FOREIGN PATENT DOCUMENTS

EP 0 961 283 A2 12/1999

(Continued)

OTHER PUBLICATIONS

International Search Report for PCT Application No. PCT/GB02/04216, Filed Sep. 17, 2002; Date Search Completed Nov. 21, 2002; Date Search Mailed Dec. 4, 2002.

(Continued)

*Primary Examiner*—Tuan V Thai
*Assistant Examiner*—Yong Choe
(74) *Attorney, Agent, or Firm*—Edell, Shapiro & Finnan, LLC

(57) ABSTRACT

Multiple data devices (A,B,C) are interfaced via a bus arbiter (S) with an external memory (F) so as to support burst-mode access by each device (A,B,C) one or more read registers (R1,R2,R3) are provided in the memory (F), and each register (R1,R2,R3) supports burst-mode access by a corresponding device (A,B,C). The arbiter (s) selects the register to be used following the initial access burst, according to the device requiring access. Thus, the memory (F) supports multiple burst-mode accesses in parallel.

10 Claims, 2 Drawing Sheets

Multiple Embedded Processor SoC

U.S. PATENT DOCUMENTS

| | | |
|---|---|---|
| 6,216,180 B1 | 4/2001 | Kendall et al. |
| 6,278,654 B1 | 8/2001 | Roohparvar |
| 6,457,075 B1 * | 9/2002 | Koutsoures ................... 710/35 |
| 6,460,133 B1 * | 10/2002 | Nunez et al. ................ 712/214 |
| 2002/0012278 A1 * | 1/2002 | Akaogi et al. ............... 365/200 |

FOREIGN PATENT DOCUMENTS

| | | |
|---|---|---|
| JP | 09-210686 | 2/1999 |
| JP | 2000-182983 | 1/2002 |

OTHER PUBLICATIONS

Japanese Office Action dated Jun. 24, 2008 in counterpart Japanese Application No. 2003-529329.

* cited by examiner

Normal Burst Mode Access

Multiple Embedded Processor SoC

INTERFACING PROCESSORS WITH EXTERNAL MEMORY SUPPORTING BURST MODE

BACKGROUND OF THE INVENTION

This invention relates to interfacing one or more devices, such as processors, with an external memory via a single bus arbiter.

In order to speed up access to FLASH memory, a page-mode or burst-mode has been developed in which an initial access incorporates multiple consecutive memory address codes so as to read out a block of data into a register which is then accessed incrementally in subsequent accesses until all of the data has been accessed, at which time, the process can be repeated. The advantage of the burst-mode is that each subsequent access can be much short than the initial access, typically, 30 nS for 16 bits compared with 70 nS for initially accessing a block of 128 bits. Burst-mode access is illustrated in FIG. 1 in which an initial access has an address code N and subsequent accesses have address codes N+1, N+2 and N+3. This data burst is ten followed by a second data burst with address codes in the range M.

Burst-mode access makes use of the fact that a processor executes code in a linear fashion to produce consecutive address codes so that once submitted in an initial access, this need not be repeated in subsequent accesses, which can therefore be shorter. However it follows that if the processor does not access all of the data in subsequent accesses, perhaps because it instead requires data at other addresses, then the benefit of fast access is reduced because of more frequent longer initial accesses.

Furthermore sharing of a FLASH memory burst-mode access between multiple processors presents problems which make its use impractical in some circumstances. Thus, for example, multiple embedded processors in an ASIC would beneficially access a single external FLASH memory via a single bus arbiter which determines priority of access between the processors. The use of a single FLASH memory rather than multiple memories, reduces cost, and the number of pins required at the interface connection between the ASIC and memory is kept to a minimum. However, if burst-mode access is used for one or more of the processors, and the benefit is to be maximised by preventing interruption of a burst by other processors, then the latency of access of other processors is increased. There is therefore a compromise between the effective use of burst-mode access by one processor and the latency of access suffered by others. This is exacerbated when individual processors require a higher priority of access, and disrupt burst-mode access by other processors, without necessarily using the burst-mode access themselves. This problem becomes worse if higher priority processors are also required to run at a higher effective MIPS rate.

FIG. 2 illustrates burst-mode access by a first processor over an address range N which is interrupted by higher priority accesses from a second processor over an address range M. The initial access N is followed by a subsequent access N+1, but before subsequent accesses in the address range N can be completed, access is given to the higher priority access M for the second processor. Once this access is completed, access is restored for the first processor, but this has to start again with a longer initial access N+2 before a subsequent access N+3 is completed the second processor then again interrupts with an access M+1 because of its higher priority, before access is again restored to the first processor with N+4 and N+5. Effective use of the burst-mode for the address range N is therefore frustrated by the accesses for the higher priority address range M, and the address range M cannot itself make use of the burst-mode, even though the address codes M and M+1 are consecutive addresses. The average data throughput is therefore severely compromised, approaching the worst case of maxim access time for every access from every processor.

SUMMARY OF THE INVENTION

An object of the present invention is to provide a method of interfacing one or more processors with an external memory via single bus arbiter so as to reduce or overcome some of the above problems.

This is achieved according to one aspect of the invention by that the arbiter identifies the processor or other device associated with each access to memory, and that the memory has multiple block read registers which are select according to the identity of the processor or other device associated with each access.

The memory can therefore support multiple burst-mode accesses in parallel by holding burst data associated with each in a separate block read register, and reading data from each register according to the processor identified in each access submitted by the arbiter.

The number of block read registers need not necessarily be equal to the number of processors. If there are fewer registers than processors, then the arbiter may share one or more of the block read registers between particular processors, which are preferably selected as having lower bandwidth requirements. If there are more registers than processors, then the arbiter may use two or more registers to support two or more address code ranges or data bursts from a single processor. As an example, this could effectively separate code and data accesses where these occur contiguously at different address range.

According to another aspect, the invention consists in a method of interfacing a processor or other device with an external memory via a single bus arbiter, in which the arbiter identifies a range of memory address codes for each access to the memory, and the memory has multiple block read registers which are selected according to the identity of the range of address codes associated with each access.

BRIEF DESCRIPTION OF THE DRAWINGS

The invention will now be described by way of example with reference to the accompanying drawing in which.

DETAILED DESCRIPTION OF PREFERRED EMBODIMENTS

Figure 1:
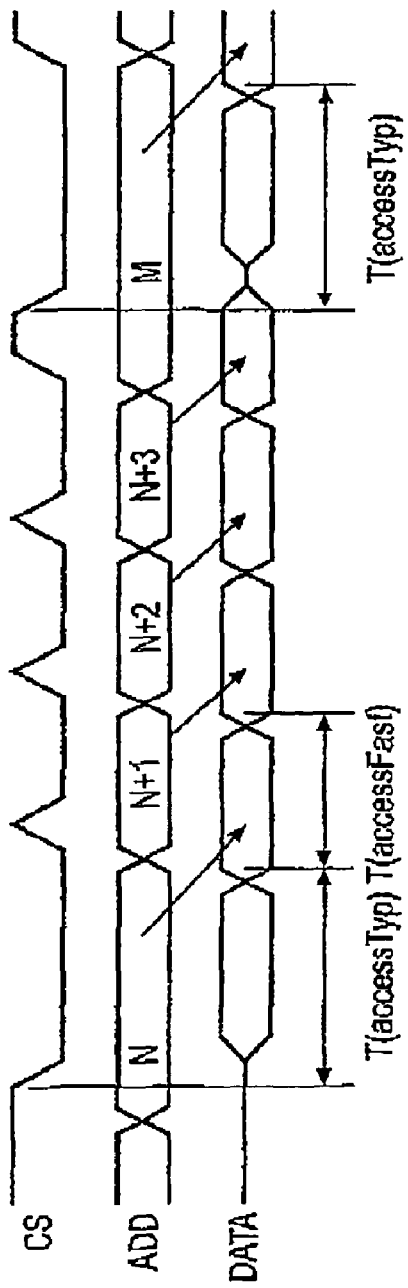
FIG. 1 illustrates normal burst-mode access between a single processor and an external FLASH memory.
Figure 2:
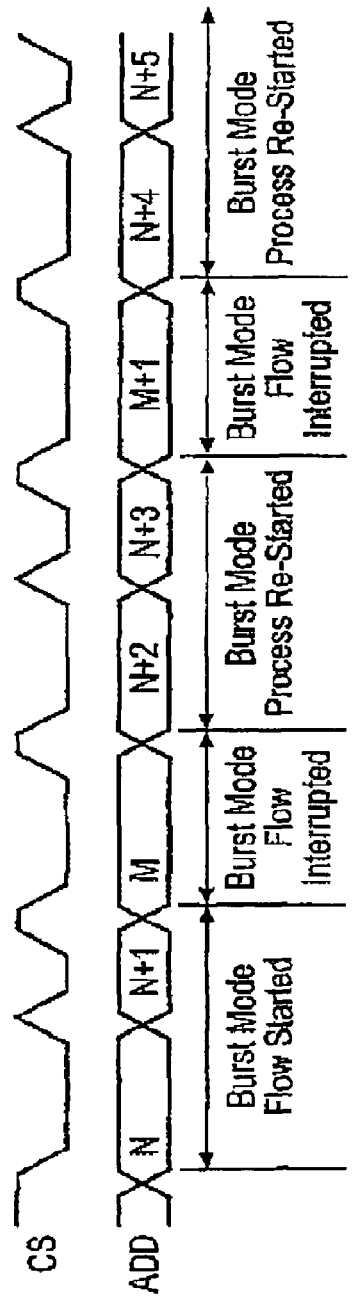
FIG. 2 shows how two processors might access an external FLASH memory via a bus arbiter.
Figure 3:
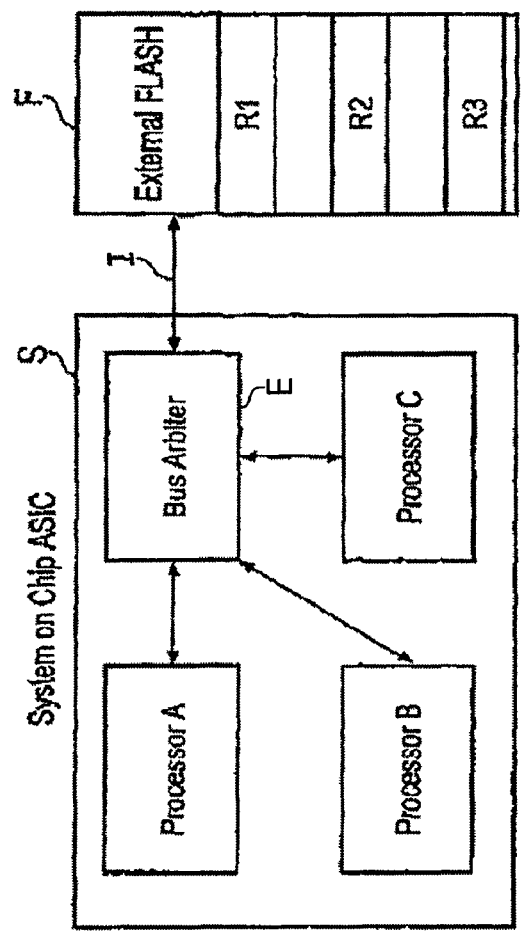
FIG. 3 is a schematic diagram of one embodiment of the invention.

FIG. 3 shows a system-on-chip ASIC which incorporates tree processor cores A, B and C and a bus arbiter. The bus arbiter is connected through a multiple pin interface I with an external FLASH memory device F. The FLASH memory device F incorporates a burst-mode access mechanism and three block read registers R1, R2 and R3 with a binary coded selection system, for example two wires would allow selection of up to four separate block read registers.

The processors A, B and C submit access requests to the bus arbiter E, which arbitrates according to predetermined priorities in giving access to the FLASH memory F over the interface I. The bus arbiter identifies the processor which is being given access and this is communicated to the FLASH memory device so that the processor is associated with the particular block read register which is selected for accessing data in the FLASH memory.

Because the FLASH memory can support burst-mode access, each of the block read registers can hold a data burst to support multiple accesses at consecutive addresses which may be incremented or decremented. This data can be read out of the registers and passed back to the respective processors under the control of the bus arbiter. Therefore, data passing over the interface is interleaved as between the different block read registers, but this does not detract from the efficiency of the burst-mode access, which is preserved by the data being stored separately in each block read register. The bus arbiter E therefore simply arbitrates on the basis of the predetermined priorities without concern for reducing efficiency by interrupting burst-mode access.

Figure 4:
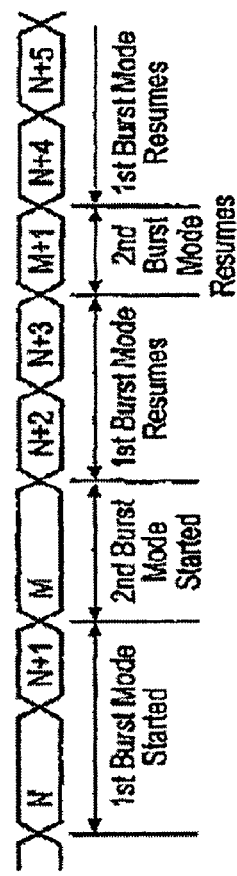
FIG. 4 shows how the bus arbiter controls accesses by the multiple processors to the external FLASH memory in the embodiment of FIG. 3.

The manner in which two processors access respective data bursts which are set up initially in separate block read registers is shown in FIG. 4. The one data burst is set up by an initial access N and the other by an initial access M, and although the data burst M interrupts the data burst N, the subsequent accesses N+1 to N+5 and M+1 all benefit from being short access periods.

It will be appreciated that the changes to the bus arbiter which are made according to the invention, will not prevent it from operating in the standard mode if it is connected to a standard external FLASH memory with a single block read register.

Also, it will be appreciated that, although the invention has been described in relation to access to a FLASH a memory, it is equally applicable to access to external RAM.

Finally, although the identity of a processor or other device accessing the memory may be fixed, it is also possible to assign an access identity to a device based on a programmable address range. Also, the identity allocation may be changed dynamically based on system requirements. For example, instead of a processor the device requiring access may be a Direct Memory Access DMA module.

The invention claimed is:

1. Apparatus comprising multiple data devices and a bus arbiter controlling access by the devices to an external memory via an interface, wherein the external memory comprises multiple read registers, each of which supports burst-mode access by a corresponding data device, with the bus arbiter selecting one of the multiple read registers to be used following an initial access burst according to the identity of the data device requiring access, interrupting burst-mode access by one device to allow burst-mode access by another device according to predetermined priorities associated with said devices, and resuming the burst-mode access by the one device, wherein the initial access burst by the one device is longer than an immediate subsequent access burst by the one device, and when burst-mode access by the one device is resumed after being interrupted by the burst-mode access by the another device, the burst-mode access by the one device has a same period as the immediate subsequent access burst by the one device.

2. Apparatus as claimed in claim 1 in which the identity of a data device is fixed.

3. Apparatus as claimed in claim 1 in which the identity of a data device is based on a programmable address range.

4. Apparatus as claimed in claim 1 in which the identity allocation is changed dynamically based on operating requirements.

5. Apparatus as claimed in claim 1 in which the identity of a data device is binary coded.

6. Apparatus as claimed in claim 1 in which the data devices comprise processors or Direct Memory Access modules.

7. Apparatus as claimed in claim 1 in which the memory comprises a FLASH memory or a RAM memory.

8. Apparatus as claimed in claim 1, wherein the bus arbiter selects successive read registers to be used until burst-mode access by all data devices is completed.

9. A method of interfacing multiple data devices via a bus arbiter with an external memory so as to support burst-mode access by each data device, wherein multiple read registers are provided in the memory, each of which is used to support burst-mode access by a corresponding data device, with the bus arbiter selecting one of the multiple read registers to be used following an initial access burst according to the identity of the data device requiring access, interrupting burst-mode access by one device to allow burst-mode access by another device according to predetermined priorities associated with said devices, and resuming the burst-mode access by the one device, wherein the initial access burst by the one device is longer than an immediate subsequent access burst by the one device, and when burst-mode access by the one device is resumed after being interrupted by the burst-mode access by the another device, the burst-mode access by the one device has a same period as the immediate subsequent access burst by the one device.

10. An external memory for interfacing with multiple data devices via a bus arbiter so as to support burst-mode access by each data device, wherein the external memory device includes multiple read registers, each of which is used to support burst-mode access by a corresponding data device, so that the bus arbiter can select one of multiple read registers to be used following an initial access burst according to the identity of the data device requiring access, interrupt burst-mode access by one device to allow burst-mode access by another device according to predetermined priorities, and resume the burst-mode access by the one device, wherein the initial access burst by the one device is longer than an immediate subsequent access burst by the one device, and when burst-mode access by the one device is resumed after being interrupted by the burst-mode access by the another device, the burst-mode access by the one device has a same period as the immediate subsequent access burst by the one device.

* * * * *

UNITED STATES PATENT AND TRADEMARK OFFICE
CERTIFICATE OF CORRECTION

PATENT NO. : 7,716,442 B2  Page 1 of 1
APPLICATION NO. : 10/489800
DATED : May 11, 2010
INVENTOR(S) : Eugene Pascal Herczog It is certified that error appears in the above-identified patent and that said Letters Patent is hereby corrected as shown below:

On the Title page of the patent, (73) Assignees: replace the following:

"MStar Software R&D, Ltd., Shenzen (TW);
MStar France SAS, Issy les Mouineaux (FR)"

with the following:

-- MStar Software R&D, Ltd., Shenzhen (CN)
MStar France SAS, Issy les Moulineaux (FR) --

Signed and Sealed this

Thirteenth Day of July, 2010

David J. Kappos
*Director of the United States Patent and Trademark Office*